March 31, 1964 W. T. BIRGE 3,126,984
SHOE BRAKE CONSTRUCTION WITH LOW-FRICTION BEARING MEANS
Filed June 1, 1962 2 Sheets-Sheet 1

INVENTOR.
William T. Birge
BY
Harness, Dickey & Pierce
ATTORNEYS

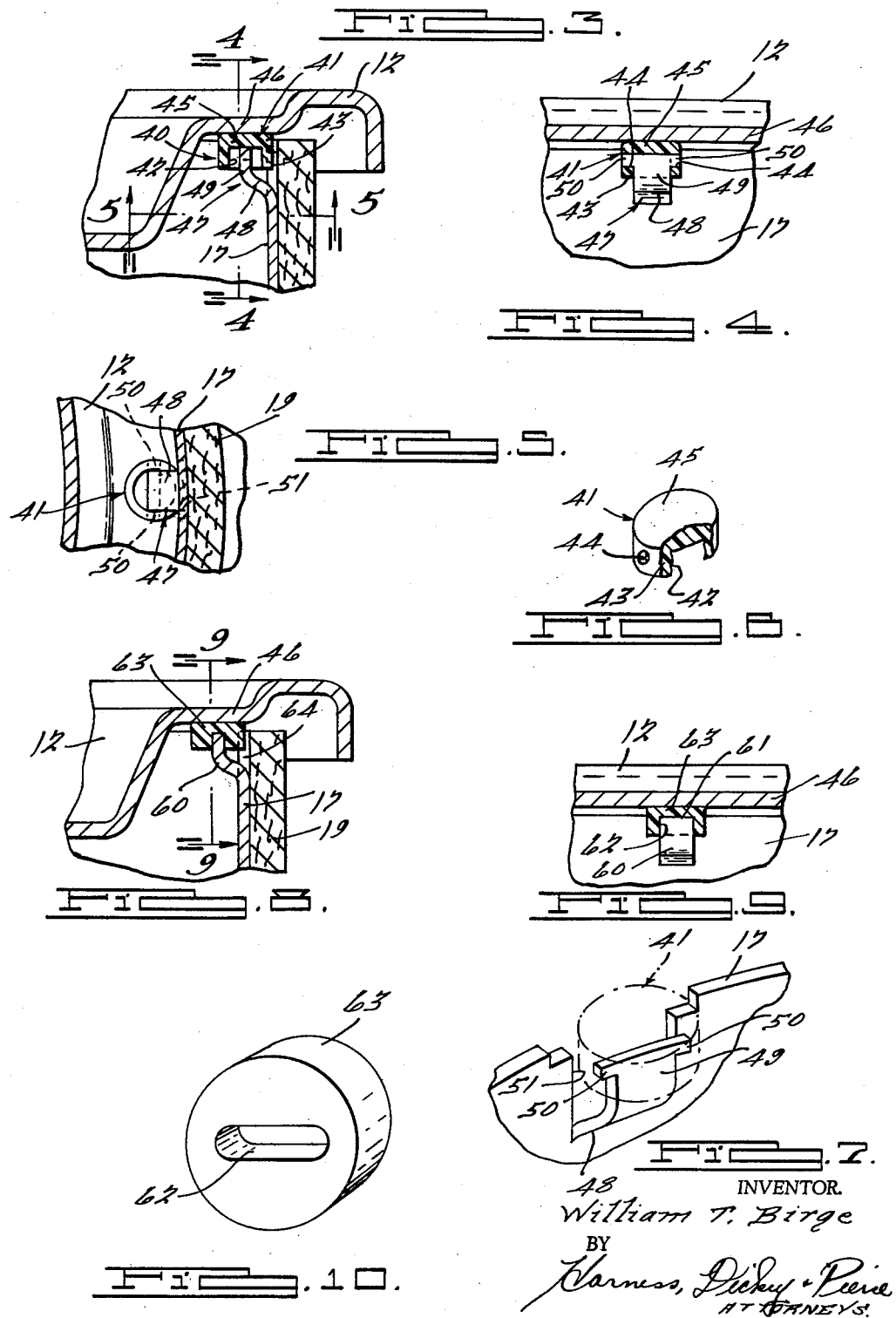

United States Patent Office 3,126,984
Patented Mar. 31, 1964

3,126,984
SHOE BRAKE CONSTRUCTION WITH LOW-FRICTION BEARING MEANS
William T. Birge, Plymouth, Mich., assignor to Kelsey-Hayes Company, Romulus, Mich., a corporation of Delaware
Filed June 1, 1962, Ser. No. 199,522
2 Claims. (Cl. 188—78)

This invention relates to vehicle brakes and particularly to drum type brakes that comprise an annular braking drum, arcuate brake shoes having rim portions supporting brake linings, and a stationary backing plate upon which the brake shoes are supported, with the edges of the rim portions thereof in engagement therewith, and with respect to which the brake shoes are movable upon actuation thereof by the brake actuating mechanism.

In prior art structures, the metallic engagement of the rim of the brake shoe with the backing plate has resulted in an undesirably high coefficient of friction. Inasmuch as the brake shoes are held against the backing plate by springs or the like, considerable initial pedal effort has been required to overcome this frictional force and produce radial expansion of the shoes into contact with the drum. The magnitude of the frictional resistance of the shoes to movement increases as the backing plate becomes worn, corroded or otherwise roughened. Also, the metal-to-metal sliding contact of the brake shoes on the backing plate can produce objectionable noise or squeaks and prevent the proper return of the brake shoes, thereby causing dragging of the brakes.

Heretofore, various attempts have been made to eliminate friction between the shoe and backing plate and to provide for a freer, smoother movement of the brake shoe over the surface of the backing plate. Such prior attempts at eliminating the incumbent objections and deficiencies in prior art brake structures have resulted in mere temporary or transitory relief requiring periodic attention to insure continuous satisfactory operation.

It is therefore an object of this invention to provide a substantially frictionless bearing surface between the brake shoe and backing plate which will be noiseless and which will prevent spasmodic or uneven movement of the brake shoes upon application and release of the brakes.

Another object of this invention is to provide a bearing between the brake shoe and backing plate which will be permanently quiet and substantially frictionless throughout the life of the brake or at least for extended periods of time.

A more particular object of this invention is to provide a simple, long lasting and readily installed type of bearing between the rim of the brake shoes and the backing plate. In the embodiments of the invention shown and described herein, the bearing comprises a disk-like or button-shaped member of low-friction material carried by a tongue or projection struck from the rim of the brake shoe and extending substantially parallel thereto. The bearing member is formed with a complementary recess adapted to engage the tongue or projection to position the bearing member to engage the backing plate or a complementary bearing surface formed on the backing plate. The low-friction material may be polytetrafluoroethylene, one type of which is known commercially as "Teflon," which may be and preferably is glass filled; or, it may be made of oil impregnated sintered porous metal of the type which is known commercially as "Oilite." When such sintered metal is employed, the pores of the material at the bearing surface thereof must be open and this surface is impregnated with molydisulphide or lead.

The above described treatment of the "Teflon" or "Oilite," when employed, serves to enhance the antifriction characteristics of these materials and to prolong the antifriction life thereof.

Further objects of this invention are to provide a device of this type which is efficient, durable, compact, and of simple construction, comprising a minimum number of parts, whereby it may be economically manufactured and assembled with facility.

Various other objects and advantages and the novel details of construction of the invention, will become more apparent as this description proceeds, especially when considered in connection with the accompanying drawings in which:

FIGURE 3 is an enlarged detail sectional view taken substantially on the plane indicated by line 3—3 in FIGURE 1;

FIGURE 4 is a detail sectional elevational view taken substantially on the plane indicated by line 4—4 in FIGURE 3;

FIGURE 5 is a sectional elevational view taken substantially on the plane indicated by line 5—5 in FIGURE 3;

FIGURE 6 is an enlarged perspective view showing one form of the disk-like bearing member;

FIGURE 7 is a fragmentary perspective view showing the tongue or projection struck from the rim;

FIGURE 8 is a view similar to FIGURE 3 showing a modified form of bearing member;

FIGURE 9 is a detail sectional elevational view taken substantially on the plane indicated by line 9—9 in FIGURE 8; and FIGURE 10 is a perspective view of the modified form of bearing member illustrated in FIGURES 8 and 9.

Figure 1:
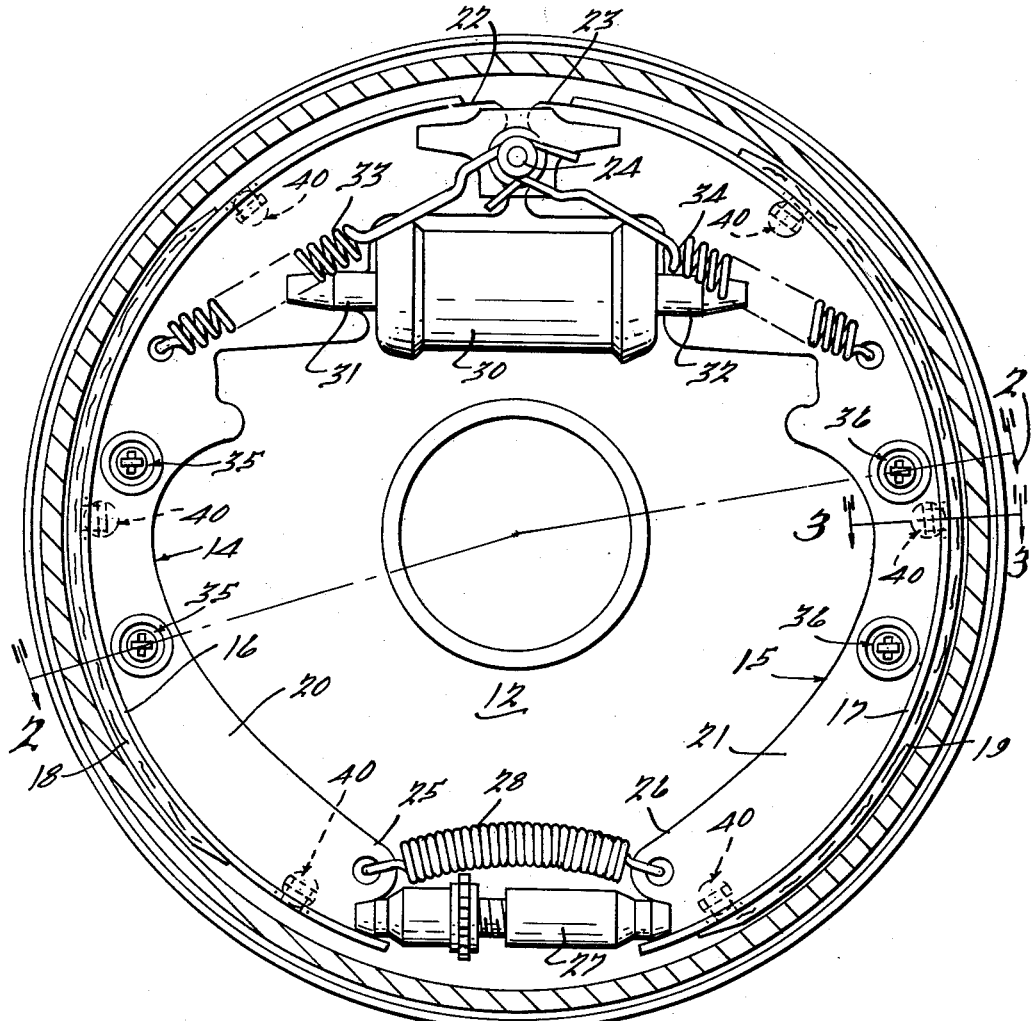
FIGURE 1 is a sectional elevational view of a brake incorporating features of this invention.
Figure 2:
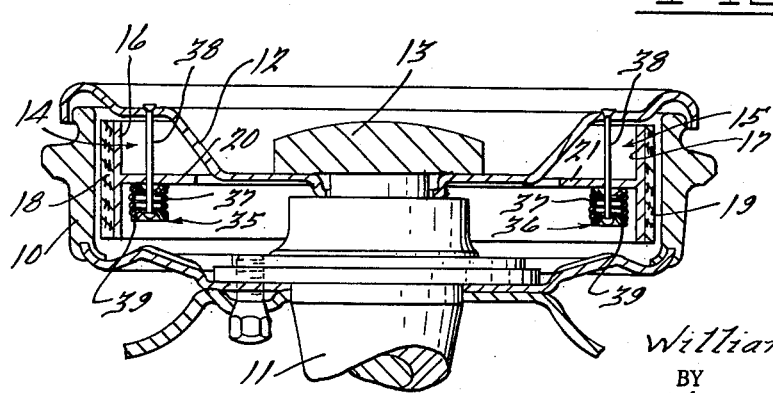
FIGURE 2 is a transverse sectional view taken substantially on the plane indicated by line 2—2 in FIGURE 1.

The illustrative embodiments of the invention are shown in the drawings as applied to a brake structure of the internal expanding type comprising arcuate brake shoes adapted to cooperate with the inner surface of the brake drum. In FIGURES 1 and 2, the reference character 10 indicates a brake drum that is mounted on the wheel hub 11 for rotation therewith. A stationary backing plate 12 is mounted on a stationary part 13 of the vehicle.

In addition to the elements already described, the basic elements of the brake structure comprise a pair of brake shoes 14 and 15 in the form of arcuate segments, said brake shoes being provided with arcuate rim portions 16 and 17 supporting lining elements 18 and 19, respectively. The rim portions 16 and 17 are reinforced against flexure by web portions 20 and 21 extending perpendicularly from the rim portions 16 and 17.

The adjacent ends 22 and 23 of the brake shoes 14 and 15 engage an anchor pin 24 fixed to the backing plate 12. The opposite adjacent ends 25 and 26 of the brake shoes 14 and 15 engage an adjusting strut 27, with shoe ends 25 and 26 being retained in engagement with the adjusting strut by means of a tension spring 28.

A hydraulic wheel cylinder 30 having plunger members 31 and 32 extending from opposite ends thereof into engagement with the webs 20 and 21 provides the actuating device for moving the brake shoes 14 and 15 into engagement with the brake drum 10. The plunger members 31 and 32 extend from piston members (not shown) within the wheel cylinder 30, hydraulic fluid being delivered into the wheel cylinder between the piston members from a conventional brake pedal operated master cylinder (not shown). Retraction springs 33 and 34 normally retain the ends 22 and 23 of the brake shoes in engagement with the anchor pin 24 when hydraulic pressure is released from the wheel cylinder 30.

The brake shoes 14 and 15 are resiliently urged into engagement with the backing plate 12 by spring assemblies 35 and 36. Each spring assembly (see FIGURE 2) comprises a spring 37 held under compression by a rod 38 that extends from the backing plate 12 and has a cap 39 to hold the spring between the cap and the web of the brake shoes, thereby resiliently urging the brake shoes toward the backing plate.

It will be understood that in the operation of the brake, the brake shoes 14 and 15 move relatively to the stationary backing plate 12, and it is the purpose of this invention to provide bearing members between the rims of the brake shoes and the backing plate which will substantially eliminate the noise and friction occasioned by this movement of the brake shoes.

In accordance with this invention, a plurality of bearings 40, here shown as three for each shoe, are provided between the rims of the brake shoes 14 and 15 and the backing plate 12. One form of such bearing is illustrated in detail in FIGURES 3, 4, 5 and 6. This bearing consists of a disk-like or button-shaped, substantially frictionless bearing member 41 formed of low-friction plastic material such as polytetrafluoroethylene, one type of which is sold under the trade name "Teflon." This bearing member is substantially cup-shaped, being provided with a central recess 42 forming an annular wall 43. The wall 43 is provided with opposed apertures 44. The cup-shaped configuration provides a closed end 45 forming a bearing surface to either directly engage the backing plate 12 or a ledge 46 formed thereon. The ledge 46 constitutes a bearing surface and may be formed by offsetting the backing plate 12 out of its general plane, as shown in FIGURES 3 and 4.

The bearing member 41 is mounted on the edge of the rim 16 or 17 (see FIGURE 7) by means of a tongue or projection 47 struck from the material of the brake shoe rim. This tongue or projection is first bent laterally as at 48 and then substantially perpendicularly thereto as at 49, so as to extend substantially parallel to the rim 16 or 17, but spaced therefrom. The free end of the tongue or projection is provided with laterally-extending studs or projections 50 which, in the preferred form of the invention, engage the apertures 44 in the bearing member 41.

In assembling the bearing member 41 with the tongue or projection 47, the bearing member is first assembled with the tongue 47 and then the tongue is bent into its position substantially parallel with the rim 16 or 17 so as to position the bearing member in the recess 51 provided when the tongue 47 is formed. This prevents shifting movement of the bearing member 41 and locks the same in place on the rim. It will be understood that the engagement of the studs 50 with the apertures 44 prevents relative rotation between the bearing member 41 and the tongue 47.

In the modification illustrated in FIGURES 8, 9 and 10, the tongue or projection 60 is formed from the material of the rim 17 in the same manner as the tongue or projection 47, except that the studs or projections 50 are eliminated. The square end 61 of the tongue or projection 60 has a press fit with a recess 62 formed in the bearing member 63. After the bearing member 63 is assembled with the tongue or projection 60, the tongue or projection is bent so as to position the bearing member 63 in the recess 64 formed in the rim 16 or 17 when the tongue or projection 60 is formed, as shown in FIGURE 8.

The bearing members 41 or 63 are preferably formed of low-friction material, such as polytetrafluroethylene or oil impregnated sintered porous metal. One type of polytetrafluoroethylene is commercially known under the trade name "Teflon." One form of the oil impregnated sintered porous metal is commercially known under the trade name "Oilite." If "Teflon" is employed as the bearing member, it may be, and preferably is, glass filled to enhance the antifriction characteristics thereof. When sintered metal is employed, the pores of the material at the bearing surface thereof must be open and this surface is preferably impregnated with molydisulphide or lead.

The above described treatment of "Teflon" or "Oilite," when employed, serves to enhance the antifriction characteristics of these materials and to prolong the antifriction life thereof.

While two forms of commercially practical embodiments of the invention have been described and illustrated herein somewhat in detail, it will be understood that various changes may be made as may come within the purview of the accompanying claims.

What is claimed is:

1. A brake comprising a backing plate, a pair of brake shoes each having a rim supported on said backing plate for movement relative thereto upon application of the brake, and a plurality of bearings between each brake shoe and the backing plate, each bearing comprising a disk-like bearing member formed of low-friction material, a tongue formed of the material of said rim and forming a recess in the rim and bent to extend in substantially parallel spaced relation thereto and having a free end, and a complementary recess in said bearing member engaging the free end of said tongue to position said bearing member for engagement with the backing plate to provide a substantially frictionless bearing between said brake shoe and backing plate, said bearing member being disposed within the recess in said rim to lock the same in place.

2. A brake comprising a backing plate, a brake shoe having a rim and supported on said backing plate for movement relative thereto upon application of the brake, a disk-shaped bearing member formed of low-friction material, said bearing member having a central recess forming a wall provided with opposed apertures, and means for mounting said bearing member on said rim comprising, a tongue formed from the material of said rim and bent to extend in substantially parallel spaced relation thereto and forming a recess in the rim, said tongue terminating in a free end, the free end of said tongue being formed with opposed projections, said bearing member being secured to said tongue by engaging the free end of said tongue in said recess with said projections engaging in said opposed apertures, said bearing member being disposed within the recess in said rim to lock the same in place.

References Cited in the file of this patent

UNITED STATES PATENTS

| | | |
|---|---|---|
| 383,809 | Herrick | May 29, 1888 |
| 1,651,000 | Rosenthal et al. | Nov. 29, 1927 |
| 2,214,104 | Hildabolt et al. | Sept. 10, 1940 |
| 2,301,756 | Shutt | Nov. 10, 1942 |
| 2,646,333 | Abrahamson et al. | July 21, 1953 |
| 2,735,710 | Dingman et al. | Feb. 21, 1956 |
| 2,796,954 | Kaiser | June 25, 1957 |
| 2,975,126 | Stott | Mar. 14, 1961 |

UNITED STATES PATENT OFFICE
CERTIFICATE OF CORRECTION

Patent No. 3,126,984

March 31, 1963

William T. Birge

It is hereby certified that error appears in the above numbered patent requiring correction and that the said Letters Patent should read as corrected below.

Column 4, line 66, for "2,975,126" read -- 2,975,128 --

Signed and sealed this 14th day of July 1964.

(SEAL)

Attest:

ESTON G. JOHNSON
Attesting Officer

EDWARD J. BRENNER
Commissioner of Paten